July 9, 1940.   L. E. LA BRIE   2,207,127
MASTER CYLINDER FOR BRAKES
Original Filed Nov. 22, 1930

INVENTOR.
LUDGER E. LABRIE
BY
Jerome R. Cox
ATTORNEY.

Patented July 9, 1940

2,207,127

UNITED STATES PATENT OFFICE 2,207,127

MASTER CYLINDER FOR BRAKES

Ludger E. La Brie, Detroit, Mich., assignor to Bendix Brake Company, South Bend, Ind., a corporation of Illinois Original application November 22, 1930, Serial No. 497,383. Renewed October 12, 1936. Now Patent No. 2,095,752, dated October 12, 1937. Divided and this application June 9, 1937, Serial No. 147,173

4 Claims. (Cl. 60—54.6)

This application is a division of my copending application Serial No. 497,383, filed November 22, 1930, renewed October 12, 1936 and issued on October 12, 1937, as Patent No. 2,095,752.

This invention relates to brakes and is illustrated as embodied in a novel system of hydraulic brakes for an automobile.

One object of the invention is the provision of a master cylinder for a hydraulic brake system arranged with a valve which is automatically opened when the piston is returned to the released position.

A further object of the invention is the provision of a master cylinder of such a hydraulic brake system so arranged as to automatically bleed the lines, i. e., fill them with liquid and eliminate entrapped air.

Figure 1:
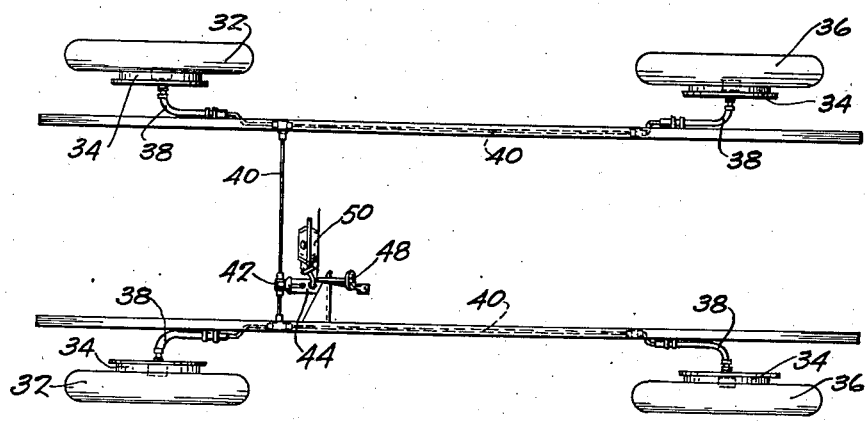
Figure 2:
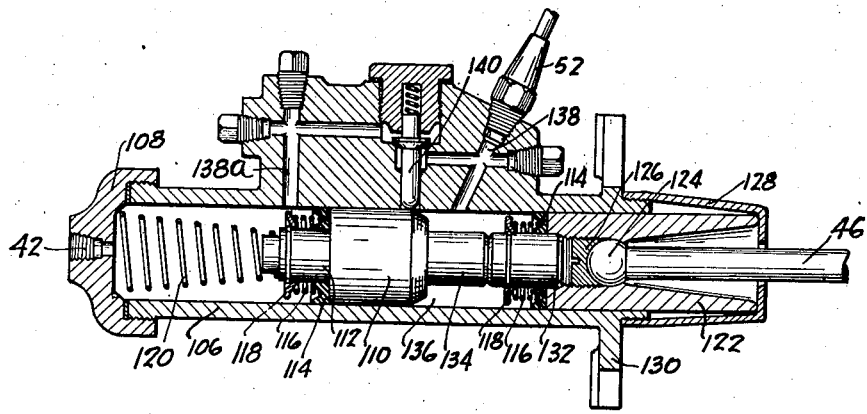

The above and other objects of the invention and features including various novel and desirable details of construction will be apparent from the following description of the illustrative embodiments shown in the accompanying drawing, in which:

Figure 1 is a top plan view of part of an automobile chassis showing the arrangement of the parts of the system of hydraulic brakes; and Figure 2 is a section through the master cylinder assembly of Figure 1.

The chassis shown in Figure 1 includes the usual chassis frame 30 supported by the usual springs on front and rear axles (not shown) carried by the front wheels 32 having brakes indicated generally at 34 and on rear wheels 36 having brakes indicated generally at 34.

The brakes are intended to be operated by a hydraulic system including flexible hose connections 38 adjacent to the four wheels and communicated by suitable pipes 40 carried by the chassis frame 30 with the outlet 42 of a master cylinder assembly 44 which is shown more in detail in Figure 2 and which contains an operating piston carried by a piston rod 46 and thus connected with the usual brake pedal 48. The hydraulic system is kept full of liquid by means of a reservoir 50 which is mounted on the dash above the master cylinder and on the opposite side of the dash from the driver. The reservoir 50 is connected to the master cylinder 44 by means such as a flexible conduit 52.

The master cylinder indicated generally at 44 includes, as shown in Figure 2, a cylinder proper 106, which may be made as a casting and one end of which is permanently closed by a cap 108 containing the outlet 42 to the conduit 40. Inside of the cylinder 106 is arranged a floating piston 110 having a cylindrical extension 112 upon which is sleeved a sealing member such as a rubber gasket 114 slidably engaging the inner face of the cylinder 106. The sealing member 114 is held in place against the face of the piston 110 by means such as a spring 116 confined between the sealing member 112 and a washer or equivalent stop 118 on the forward end of the extension 112. The piston 110 is urged in a direction to release the brakes by means such as a light spring 120 confined between the cap 108 and the stop at the end of the extension 112.

The floating piston 110 is forced to the left to apply the brake by means such as a secondary or operating piston 122 formed with a central axial opening through which the piston rod 46 passes and which is formed with a spherical seat receiving a spherical head 124 on the end of the piston rod. The spherical head 124 is embraced between the seat formed on the piston and the semi-spherical concave bottom of a plug 126 threaded into the opening in the piston, thus forming a ball-and-socket joint. The idle or released position of the auxiliary piston 122 is determined by engagement of its base with a cup-shaped stamping 128 threaded on the end of the cylinder 106 just beyond a flange 130 which is adapted to engage and be bolted to a part of the chassis frame of the car.

The auxiliary piston 122 is formed with an extension 132 disconnectedly engaging a projection 134 on the rear end of the piston 110 so that the piston 122 forces the floating piston 110 to the left to apply the brakes, but does not compel the floating piston to return to its idle position when the brakes are released. The space 126 between the two pistons is in communication by a passage 138 with the conduit 52 from the liquid reservoir so that any suction created by a quick return of the operating piston is compensated for by the introduction into the chamber 136 of compensating liquid from the reservoir. In this connection, I prefer that most of the force for returning the piston 110 should come from the brakes rather than from the spring 120 which is provided mainly to insure that when the brakes are fully released, the floating piston 110 will finally move far enough to the right in Figure 3 to clear a port 138a communicating with the conduit 52 through a passage controlled by a spring-pressed poppet valve 140 which is pushed upwardly by the conical return end of piston 110 when the brake is fully released.

In operating the master cylinder 44 for the application of the brakes, force exerted on the pedal 48 acts through the piston rod 46 and moves the pistons 122 and 110 forward. The piston 110 soon passes the port 138a and forces liquid through the port 42 and the conduits 40 and 38 to the wheel cylinders and thus applies the brakes 34. Movement forward of the piston 110 allows the valve 140 to close. Because the valve 140 is closed by the first movement of the piston 110, it is unnecessary that the port 138a should be closed immediately. When the applying force is relieved from the pedal 148 the pistons 122 and 110 are returned by the pressure of liquid acting on their forward faces. The pressure of the liquid reservoir 50 immediately forces the piston 122 rearwardly and as soon as pressure is communicated from the wheel cylinder through the conduits 40 to the front of the piston 110, that piston is also forced back. However, the piston 110 is never drawn back by the movement of the piston 122 and therefore there is no suction created to draw in air in front of the piston 110. On the complete return of the piston 110 it raises the valve 140 to open the valve.

The upward movement of the valve 140 establishes communication between the liquid in the reservoir and the space in the cylinder 106 in front of the floating piston 110 and thereby communicates the pressure in the liquid reservoir to the entire hydraulic system. As soon as the brake is applied, however, the piston 110 cuts off the port 138a and at the same time allows the valve 140 to seat itself to cut off back pressure from the hydraulic system to the liquid reservoir and chamber 136. This, however, does not interfere with the free communication between the liquid reservoir and the space between the pistons 110 and 122, which space therefore serves at all times as a liquid seal effectively preventing any building up of suction anywhere in the assembly which might cause the introduction of air.

While one illustrative embodiment of the invention has been described in detail, it is not my intention to limit the scope of the invention to that particular embodiment, or otherwise than by the terms of the appended claims.

I claim:

1. In hydraulic brake apparatus a master cylinder provided with a forward inlet port, a rearward inlet port and a passage connecting said ports, a reservoir for a reserve supply of liquid, a connection between said reservoir and said rearward port, a check valve formed with a stem extending into said master cylinder and positioned in said passage for at times preventing the passage of fluid rearwardly through said passage, a seat for said valve, a floating piston in said master cylinder positioned normally at a point between said forward passage and said rearward passage and normally bearing upon said stem so as to raise said valve from its seat and to allow substantially free passage of liquid between said forward port and said rearward port, a spring bearing on said valve and urging it towards its seat, a second piston in said master cylinder positioned rearwardly of both of said inlet ports and normally bearing upon said floating piston.

2. In hydraulic brake apparatus a master cylinder provided with a forward inlet port, a rearward inlet port and a passage connecting said ports, a reservoir for a reserve supply of liquid, a connection between said reservoir and said rearward port, a check valve formed with a stem extending into said master cylinder and positioned in said passage for at times preventing the passage of fluid rearwardly through said passage, a seat for said valve, a floating piston in said master cylinder positioned normally at a point between said forward passage and said rearward passage and normally bearing upon said stem so as to raise said valve from its seat and to allow substantially free passage of liquid between said forward port and said rearward port, a spring bearing on said valve and urging it towards its seat, a second piston in said master cylinder positioned rearwardly of both of said inlet ports and normally bearing upon said floating piston, said check valve being closed upon movement of said forward piston so as to prevent rearward passage of liquid while allowing substantially free forward passage of liquid.

3. A brake operator comprising a master cylinder formed with a brake applying outlet and a port and adapted to hold liquid for applying brakes; a reservoir for providing a reserve supply of liquid; a floating operating piston for applying braking pressure to the liquid in the cylinder, having a rearwardly-extending projection and normally positioned rearwardly of said port, but adapted to move forward over said port; a driver operated piston in the cylinder behind the first piston and disconnectedly engaging said projection; and means for maintaining said cylinder supplied with an adequate supply of liquid comprising a liquid connection from said reservoir continuously connected to said cylinder between said pistons, whereby the driver operated piston may be drawn back upon release of the brake while the floating piston is not necessarily drawn back and therefore there is no tendency to suck in fluid from the brake applying outlet.

4. A brake operator comprising a master cylinder formed with a brake applying outlet and a port and adapted to hold liquid for applying brakes; a reservoir for providing a reserve supply of liquid; a floating operating piston for applying braking pressure to the liquid in the cylinder and normally positioned rearwardly of said port, but adapted to move forward over said port; a driver operated piston in the cylinder behind the first piston and disconnectedly engaging said piston; and means for maintaining said cylinder supplied with an adequate supply of liquid comprising a liquid connection from said reservoir continuously connected to said cylinder between said pistons, whereby the driver operated piston may be drawn back as the brake is released without necessarily drawing back the floating piston and therefore there is no tendency to suck in fluid from the brake applying outlet.

LUDGER E. LA BRIE.